US012057691B2

(12) United States Patent
Ciesielczyk et al.

(10) Patent No.: US 12,057,691 B2
(45) Date of Patent: Aug. 6, 2024

(54) CABLE SPACER COMPRISING A RATCHET SPACER CLAMP

(71) Applicant: PREFORMED LINE PRODUCTS CO., Mayfield Village, OH (US)

(72) Inventors: Benjamin Franklin Ciesielczyk, Madison, OH (US); Jacob Palmer, Chesterland, OH (US); Cameron Clines, Chagrin Falls, OH (US)

(73) Assignee: PREFORMED LINE PRODUCTS CO., Mayfield Village, OH (US)

( * ) Notice: Subject to any disclaimer, the term of this patent is extended or adjusted under 35 U.S.C. 154(b) by 0 days.

(21) Appl. No.: 18/198,047

(22) Filed: May 16, 2023

(65) Prior Publication Data

US 2023/0369843 A1 Nov. 16, 2023

Related U.S. Application Data

(63) Continuation of application No. 17/187,801, filed on Feb. 27, 2021, now Pat. No. 11,652,344.

(60) Provisional application No. 62/983,208, filed on Feb. 28, 2020.

(51) Int. Cl.
*H02G 7/12* (2006.01)
*H02G 7/20* (2006.01)

(52) U.S. Cl.
CPC .............. *H02G 7/12* (2013.01); *H02G 7/20* (2013.01)

(58) Field of Classification Search
CPC .. H02G 7/12; H02G 7/20; H02G 7/08; H02G 7/00; H02G 7/02; H02G 7/04; H02G 7/14
USPC ........ 174/146, 40 CC, 42, 40 R, 44; 248/61, 248/74.1, 74.2, 68.1, 49
See application file for complete search history.

(56) References Cited

U.S. PATENT DOCUMENTS

| 3,161,721 A | 12/1964 | Torr |
| 3,716,650 A | 2/1973 | De Mecquenem |
| 4,020,277 A | 4/1977 | La Chance, Sr. et al. |

(Continued)

FOREIGN PATENT DOCUMENTS

| EP | 2544321 A1 | 1/2013 |
| GB | 1587233 | 4/1981 |
| WO | 2008086480 A1 | 7/2008 |

OTHER PUBLICATIONS

Corresponding International Patent Application No. PCT/US2021/020144, International Search Report and Written Opinion of the Searching Authority, mailed Aug. 4, 2021.

(Continued)

*Primary Examiner* — Angel R Estrada
(74) *Attorney, Agent, or Firm* — Cooper Legal Group, LLC (57) ABSTRACT

A cable spacer for maintaining positions of a plurality of cables relative to each other is provided. The cable spacer includes a frame, a hanger and a plurality of clamps that couple the plurality of cables to the frame to maintain the positions of the plurality of cables relative to each other. A first clamp includes a receiver with a first arcuate surface, and a keeper that is adjustably coupled to the receiver to be adjusted from a first position to a second position to interfere with removal of the region of the first cable from the first concave pocket. A locking system adjusts the keeper from the first position to the second position relative to the receiver, and maintains the keeper in the second position to exert a compressive force on the first cable, urging the first cable into the first concave pocket.

20 Claims, 9 Drawing Sheets

(56) References Cited

U.S. PATENT DOCUMENTS

| | | |
|---|---|---|
| 4,082,917 A | 4/1978 | Hendrix |
| 4,657,284 A | 4/1987 | Fiori |
| 5,021,612 A | 6/1991 | Joffe |
| 5,700,980 A | 12/1997 | Bello |
| 6,043,433 A | 3/2000 | Schweitzer, Jr. |
| 6,047,930 A | 4/2000 | Bello |
| 6,096,970 A | 8/2000 | Katoh et al. |
| 6,135,398 A | 10/2000 | Quesnel |
| 6,170,783 B1 | 1/2001 | Bello |
| 6,198,042 B1 | 3/2001 | Huston |
| 6,303,856 B1 | 10/2001 | Bello |
| 6,753,750 B1 | 6/2004 | Posadas-Sanchez |
| 6,774,303 B1 | 8/2004 | Brittain et al. |
| 7,323,636 B1 * | 1/2008 | Borges .................... H02G 7/12 174/44 |
| 7,378,593 B2 | 5/2008 | Bukovink et al. |
| 7,692,100 B2 | 4/2010 | Boisclair |
| 7,805,814 B2 | 10/2010 | Cho |
| 8,309,846 B2 | 11/2012 | Espindola |
| 8,500,073 B2 | 8/2013 | Quesnel |
| 9,000,299 B2 | 4/2015 | Ruth |
| 9,444,240 B2 | 9/2016 | Argyle |
| 9,570,897 B2 | 2/2017 | Dobrinski |
| 9,948,080 B2 | 4/2018 | Bentley et al. |
| 11,482,847 B2 * | 10/2022 | Clement ................ H02G 7/053 |
| 11,652,344 B2 * | 5/2023 | Ciesielczyk ............. H02G 7/20 174/146 |
| 2014/0216808 A1 | 8/2014 | Ahlisch et al. |

OTHER PUBLICATIONS

Corresponding International Patent Application No. PCT/US2015/068042, International Search Report and Written Opinion of the Searching Authority, mailed Jul. 22, 2016.

* cited by examiner

CABLE SPACER COMPRISING A RATCHET SPACER CLAMP

CROSS REFERENCE TO RELATED APPLICATIONS

This application is a continuation of and claims priority to U.S. Non-Provisional patent application Ser. No. 17/187,801 filed on Feb. 27, 2021, which claimed priority to U.S. Provisional Patent Application No. 62/983,208, filed on Feb. 28, 2020, both entitled "CABLE SPACER COMPRISING A RATCHET SPACER CLAMP," both of which are hereby incorporated by reference herein.

TECHNICAL FIELD

This disclosure generally relates to cable spacers and, more specifically, cable spacers for that comprise a plurality of ratchet spacer clamps that maintain positions of a plurality of cables relative to each other.

BACKGROUND

Overhead high-voltage power transmission or distribution systems typically have a plurality of electrically conductive cables. A cable spacer is used to separate the conductive cables from each other, thereby limiting the possibility of a fault resulting from contact between two or more of the conductive cables. Generally, clamps provided to the cable spacer cooperate with different conductive cables of the power transmission system. A frame coupled to the clamps maintains separation between those clamps and, accordingly, the portions of the respective conductive cables received by the clamps.

The conductive cables of a power transmission system are commonly suspended from poles or towers. Due to their weight, the suspended conductive cables sag between neighboring poles or towers. Cable spacers have a tendency to slip along the length of the conductive cables over time toward the low point along the sagging conductive cables between the neighboring poles or towers. This undesirable slippage is worsened by environmental factors such as ice accumulation on the conductive cables that lowers the coefficient of friction between the cable spacer and the conducting cables, and makes the sag of the conductive cables more pronounced. As a result, cable spacers often move from a point of installation, where they establish a desired separation of the conductive cables, to a central region of the conductive cables between poles or towers.

In an attempt to limit movement of the cable spacer along the length of conductive cables, installers are instructed to tighten the clamps provided to the cable spacers onto the conductive cables. However, the cable spacers are installed along conductive cables high in the air, where installers have limited leverage to exert on hand-tightened clamps to establish a tight fit that effectively limits slippage of the cable clamps. Further, such clamps include locking members that flex while being installed on the conductive cables, and return to an unbiased shape once the tightening force imparted during installation is removed. Such relaxation of the locking member limits the clamping force that can be imparted on the conductive cables by the installed clamps, worsening slippage of the cable spacer along the conductive cables.

SUMMARY

This summary is provided to introduce concepts in a simplified form that are further described below in the detailed description. This summary is not intended to identify key factors or essential features of the claimed subject matter, nor is it intended to be used to limit the scope of the claimed subject matter.

According to an aspect, a cable spacer for maintaining positions of a plurality of cables relative to each other is provided. The cable spacer includes a frame and a hanger that suspends the frame from a support member. A plurality of clamps couple the plurality of cables to the frame to maintain the positions of the plurality of cables relative to each other. A first clamp of the plurality of clamps cooperates with a region of a first cable of the plurality of cables. The first clamp includes a receiver comprising a first arcuate surface defining a first concave pocket that receives the region of the first cable, and a keeper. The keeper is adjustably coupled to the receiver to be adjusted to a first position relative to the receiver. A portion of the keeper is separated from the first arcuate surface by the region of the first cable received within the first concave pocket, and interferes with removal of the region of the first cable from the first concave pocket. A locking system is adjustably coupled to the keeper to adjust the keeper from the first position to a second position relative to the receiver, maintaining the keeper in the second position. The portion of the keeper, in the second position, exerts a compressive force on the region of the first cable, urging the region of the first cable into the first concave pocket.

According to an aspect, a clamp for maintaining a position of a cable is provided. The clamp includes a receiver including an arcuate surface defining a concave pocket that receives a region of the cable. A keeper is adjustably coupled to the receiver to be adjusted to a first position relative to the receiver. A portion of the keeper is separated from the arcuate surface by the region of the cable received within the concave pocket, and interferes with removal of the region of the cable from the concave pocket. The clamp also includes a locking system adjustably coupled to the keeper to adjust the keeper from the first position to a second position relative to the receiver, and maintain the keeper in the second position. The portion of the keeper, in the second position, exerts a compressive force on the region of the cable, urging the region of the cable into the concave pocket.

According to an aspect, a cable spacer for maintaining positions of a plurality of cables relative to each other is provided. The cable spacer includes a frame, a hanger that suspends the frame from a support member, and a plurality of clamps that couple the plurality of cables to the frame to maintain the positions of the plurality of cables. A first clamp of the plurality of clamps cooperates with a region of a first cable of the plurality of cables. The first clamp includes a receiver including a first arcuate surface defining a first concave pocket that receives the region of the first cable, a guide surface that extends along a portion of the receiver, and a keeper. The keeper is adjustably coupled to the receiver to be adjusted from a first position relative to the receiver, where a portion of the keeper is separated from the first arcuate surface by the region of the first cable received within the first concave pocket, to a second position relative to the receiver, where the portion of the keeper exerts a compressive force on the region of the first cable, urging the region of the first cable into the first concave pocket. A foot is coupled to the keeper, and contacts the guide surface to interfere with deformation of the keeper during adjustment of the keeper from the first position to the second position. A locking system maintains the keeper in the second position.

According to an aspect, a cable spacer for maintaining positions of a plurality of cables relative to each other is provided. The cable spacer includes a frame, a hanger that suspends the frame from a support member, and a plurality of clamps that couple the plurality of cables to the frame to maintain the positions of the plurality of cables. A first clamp of the plurality of clamps cooperates with a region of a first cable of the plurality of cables. The first clamp includes a receiver comprising a first arcuate surface defining a first concave pocket that receives the region of the first cable, and a keeper that is adjustably coupled to the receiver to be adjusted from a first position relative to the receiver. A portion of the keeper is separated from the first arcuate surface by the region of the first cable received within the first concave pocket, to a second position relative to the receiver. In the second position, the portion of the keeper exerts a compressive force on the region of the first cable, urging the region of the first cable into the first concave pocket. An anti-slip material on the first arcuate surface interferes with axial movement of the region of the first cable within the first concave pocket.

The following description and drawings set forth certain illustrative embodiments, aspects and implementations. These are indicative of but a few of the various ways in which one or more aspects may be employed. Other aspects, advantages, and novel features will become apparent from the following detailed description when considered in conjunction with the accompanying drawings.

DETAILED DESCRIPTION

The claimed subject matter is described with reference to the drawings, in which like reference numerals are used to refer to like elements throughout. In the following description, for purposes of explanation, numerous specific details are set forth in order to provide an understanding of the claimed subject matter. It will be apparent, however, that the claimed subject matter can be practiced without these specific details. In some instances, structures and devices are illustrated in block diagram form in order to facilitate describing the claimed subject matter. Relative size, orientation, etc. of parts, components, etc. may differ from that which is illustrated while not falling outside of the scope of the claimed subject matter.

This disclosure relates to a cable spacer to be used for spacing jacketed, bundled electrical conductors (referred to herein as "cables") suspended from transmission pylons, towers or poles. In particular, this disclosure relates to a cable spacer including a clamp that imparts an improved clamping force on at least one of the cables, an anti-slip material provided to a surface of the clamp, or a combination thereof, in an attempt to interfere with slippage of the cable spacer along the cables.

For example, conventional clamps use a high-density polyethylene ("HDPE") material forming an interface that engages the cables. HDPE has a low coefficient of friction that limits the ability of the clamp to securely clamp onto a cable and limit slippage of the clamp along the cable. Conventional clamps also include a keeper that flexes excessively during tightening, and relaxes once tightening is completed, which contributes to an insufficient clamping force being exerted on the cable by the clamp to interfere with slippage of the cable spacer along the cables.

The present cable spacer comprises an improved keeper, an improved anti-slip material on a surface of the clamp that engages the cable, or a combination thereof. For example, embodiments of the improved keeper can include a guide surface that supports the keeper during tightening to limit flexing of the keeper while being urged toward the cable received by the clamp.

As an example, the improved keeper includes a lever, a spring-actuated closing system, or other mechanically-advantageous locking system that urges the keeper toward the cable received by the clamp. According to some embodiments, the improved keeper allows for a greater compressive force to be imparted on the portion of the cable received by the clamp than manual adjustment of a conventional keeper, lacking the locking system, that is pivotally adjustable about a pivot point.

As an example, a layer of a compressible, anti-slip material is applied to a surface of the clamp, to be disposed between the surface of the clamp and the cable while the clamp is fully installed on the cable. During installation, the anti-slip material compresses as a result of the keeper being urged toward the cable received by the clamp. A ratchet system comprising a plurality of teeth provided to a portion of the clamp and/or the keeper allows the keeper to be maintained at a position where the keeper prevents complete relaxation of the anti-slip material while the keeper is in a closed position.

Figure 1:
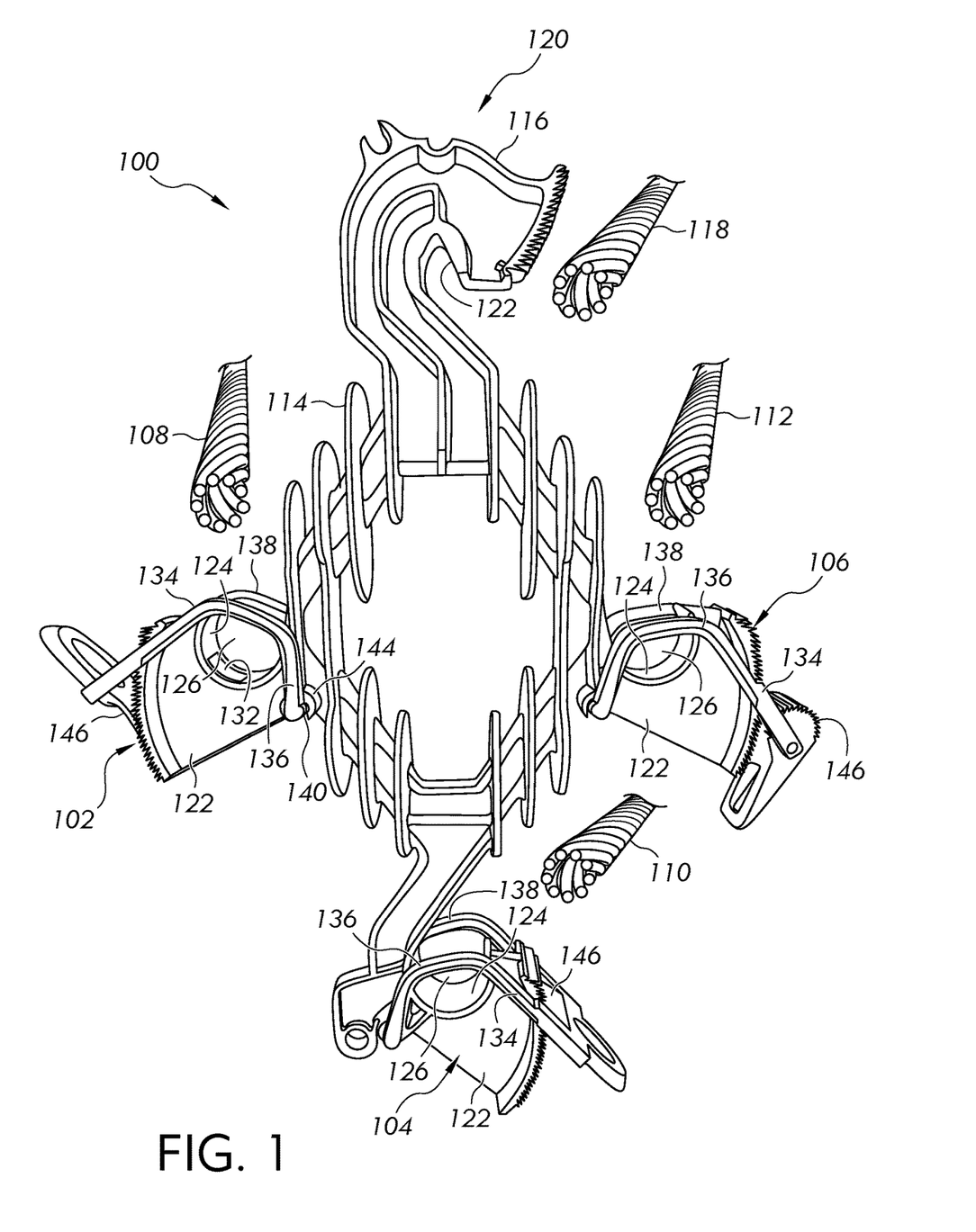
FIG. 1 is a front view of a cable spacer including a plurality of clamps that cooperate with cables to maintain positions of the cables relative to each other, according to one aspect.

One or more aspects of an improved cable spacer 100 (e.g., FIG. 1) will now be described, by way of example, with reference to the accompanying drawings. An illustrative embodiment of a cable spacer 100 that can be utilized on a three-phase circuit is shown in FIG. 1, and includes a first clamp 102, a second clamp 104 and a third clamp 106, which are referred to collectively herein as the clamps 102, 104, 106. Although the embodiment shown in FIG. 1 includes three clamps, some embodiments of the cable spacer 100 include a single clamp, for supporting a singlephase circuit from a support member, at least two clamps, or more than three clamps. For the sake of brevity and clarity, the embodiment shown in FIG. 1 will be described in detail.

Each of the plurality of clamps 102, 104, 106 in FIG. 1 cooperates with a different cable 108, 110, 112, to maintain spacing between the portions of those cables 108, 110, 112 received by the clamps 102, 104, 106 relative to each other. In order to illustrate greater detail of the clamps 102, 104, 106, the cables 108, 110, 112 are only partially shown, and it is to be understood that the cables 108, 110, 112 pass through the clamps 102, 104, 106 when the cable spacer 100 is deployed in the field. The clamps 102, 104, 106 are coupled to a frame 114. The frame 114 is a rigid structure formed from an electrically-insulating material that maintains the positions of the clamps 102, 104, 106 relative to each other. The dimensions of the frame 114 can be chosen to separate the clamps 102, 104, 106 a suitable distance from each other based on the power to be conducted by the cables that are to be received by the clamps 102, 104, 106.

The frame 114 also includes a hanger 116 that suspends the frame 114 from a support member 118 such as a messenger cable extending between neighboring poles, pylons or towers (not shown). Embodiments of the messenger cable can include a bundled, unjacketed cable that is a dedicated support structure, that does not conduct electrical energy as part of the power transmission system. The hanger 116 comprises a hook 120 or other receiver that is opening downward (e.g., concave down) to be placed on the messenger cable, thereby suspending the cable spacer 100 from the messenger cable.

The clamps 102, 104, 106 each include a receiver 122 comprising an arcuate surface 124 defining a concave pocket 126 that receives a region of the respective cable 108, 110, 112 on which the clamps 102, 104, 106 are to be installed. For example, the first clamp 102 includes a receiver 122 with an arcuate surface 124 defining a concave pocket 126 that receives a first cable 108. The second clamp 104 includes a receiver 122 with an arcuate surface 124 defining a concave pocket 126 that receives a second cable 110. The third clamp 106 includes a receiver 122 with an arcuate surface 124 defining a concave pocket 126 that receives a third cable 112.

According to some embodiments, at least a portion of the arcuate surface 124 is provided with an anti-slip material 132. For the purposes of this disclosure, the anti-slip material can include materials that have a greater coefficient of friction (static or kinetic) than the cable 108, 110, 112. In additional examples, the anti-slip material can include materials that have a greater coefficient of friction (static or kinetic) than the keeper 134. This greater coefficient of friction relative to at least one of the cable 108, 110, 112 or the keeper 134 can reduce or eliminate relative motion between the cable 108, 110, 112 and the components of the cable spacer 100. Examples of the anti-slip material include, but are not limited to, a natural or synthetic rubber, an elastomeric resin, or other elastically-compressible material. According to some embodiments, the anti-slip material 132 has a depth dimension that is compressible toward the arcuate surface 124 as a result of the compressive force exerted on the cable 108, 110, 112 received therein by at least 0.012 inches. In some examples, the anti-slip material 132 has a depth dimension that is compressible toward the arcuate surface 124 as a result of the compressive force exerted on the cable 108, 110, 112 received therein by at least 0.025 inches.

Each of the clamps 102, 104, 106 illustrated in FIG. 1 includes a keeper 134. The keeper 134 includes a first arm 136 and a second arm 138 laterally spaced apart from the first arm 136. A hinge pin 140 extends transversely across the receiver 122, and connects the first arm 136 to the second arm 138 at a proximate end 142 of the keeper 134. The hinge pin 140 is received by a hinge socket 144, allowing for pivotal adjustment of the keeper 134 relative to the receiver 122 from a first position to a second position. In the first position, a portion of the keeper 134 is separated from the arcuate surface 124, allowing for introduction of the cable 108, 110, 112 into the concave pocket 126 defined by the by the arcuate surface 124. In the second position, the portion of the keeper 134 that was separate from the arcuate surface 124 is proximate to the arcuate surface 124, but separated from the arcuate surface 124 by the cable 108, 110, 112 received in the concave pocket 126. In the second position, the keeper 134 interferes with removal of the region of the cable 108, 110, 112 from the concave pocket 126 and separation of the cable from the receiver 122. In some examples, at least a portion of the keeper 134 is provided with an anti-slip material 132, similar to the anti-slip material 132 described above in relation to the receiver 122.

The clamps 102, 104, 106 also include a locking system 146 that at least maintains the keeper 134 in the second position, where a portion of the keeper 134, in the second position, exerts a compressive force on a portion of the cable received within the concave pocket 126, urging the portion of the cable into the concave pocket 126 (e.g., toward the arcuate surface 124). According to some embodiments, the locking system 146 is adjustably coupled to the keeper 134 to adjust the keeper 134 from the first position to a second position relative to the receiver 122 when the locking system 146 is adjusted.

Figure 2:
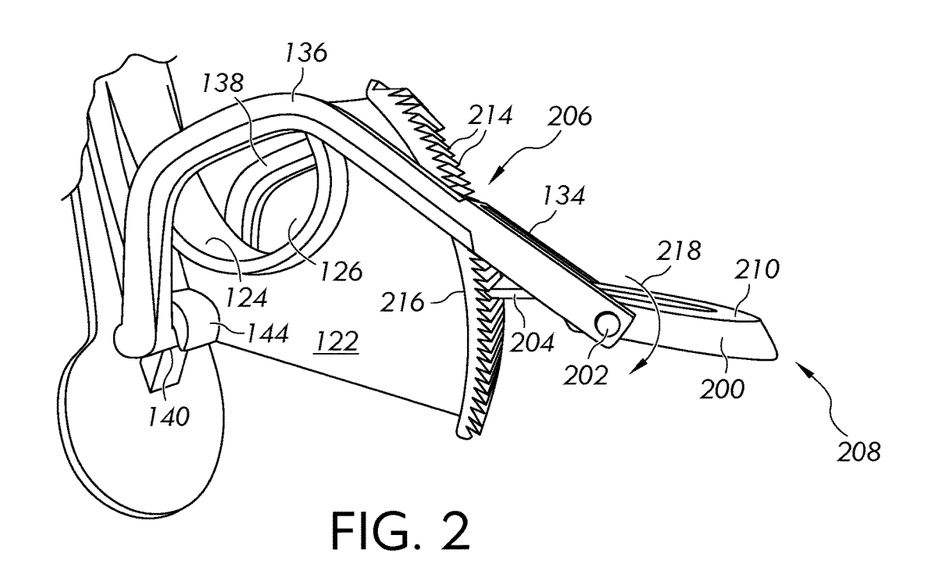
FIG. 2 is a side view of an embodiment of a clamp with a keeper in a first position.
Figure 3:
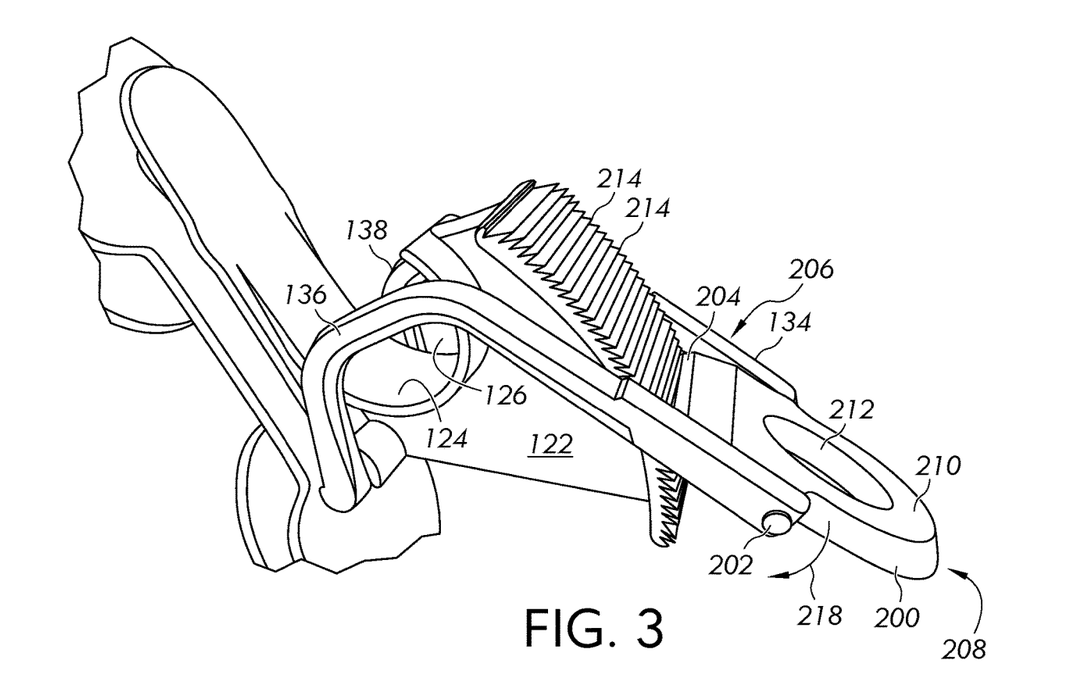
FIG. 3 is a side view of the clamp of FIG. 2, with the keeper adjusted to a second position.

FIGS. 2 and 3 illustrate embodiments of a keeper 134 adjusted by the locking system 146 from the first position (FIG. 2) to the second position (FIG. 3). According to the illustrated embodiments, the locking system 146 includes a ratcheting lever 200 that is pivotally coupled to the keeper 134 by a hinge pin 202 extending between the first arm 136 and the second arm 138.

The ratcheting lever 200 comprises a tooth 204 at a proximate end 206 and a handle 210 at a distal end 208. Embodiments of the handle 210 include an aperture 212 defined by a wall forming a portion of the handle 210 to facilitate manual grasping of the handle 210. Some embodiments of the receiver 122 include a first projection 214. In some examples, the receiver 122 includes the first projection 214 that projects from a surface 216 of the receiver 122, and the locking system 146 comprises a locking member (e.g., tooth 204) that cooperates with the first projection 214 to maintain the keeper 134 in the second position (represented by FIG. 3).

In some particular examples, the first projection 214 can be at least one, or optionally a plurality of ratchet teeth 214 or other protrusions that extend transversely, in a direction between the first arm 136 and the second arm 138, laterally across an outward facing arcuate surface 216 of the receiver 122. For simplicity, the remainder of the disclosure will use the terms "first projection" and "ratchet teeth" interchangeably, however, the described ratchet teeth are not meant to be limiting, and are just one example of possible first projections. Embodiments of the outward facing arcuate surface 216 define a curvature that extends an angular extent about the hinge pin 140 of the keeper 134 received in the hinge socket 144.

To urge the keeper 134 toward the cable received by the receiver 122, the keeper 134 is manually adjusted about the hinge socket 144 until portions of the first arm 136 and the second arm 138 of the keeper 134 are in close proximity to a region of the cable received in the concave pocket 126 defined, at least in part, by the arcuate surface 124. In this position, the outward facing arcuate surface 216 extends through a space between the first arm 136 and the second arm 138 of the keeper 134. The ratcheting lever 200 is pivotally adjusted about the hinge pin 202 (in the clockwise direction in FIGS. 2 and 3, indicated by arrow 218) through manipulation of the handle 210, causing the tooth 204 of the ratcheting lever 200 to engage at least one of the ratchet teeth 214 provided to the outward facing arcuate surface 216. Such engagement urges portions of the first arm 136 and the second arm 138 toward the cable 108, 110, 112 in the concave pocket 126, thereby establishing a compressive force on the cable 108, 110, 112 strong enough to interfere with relative axial movement of the cable 108, 110, 112 and the receiver 122, and limiting slippage of the cable spacer 100 along the cable 108, 110, 112.

Figure 4:
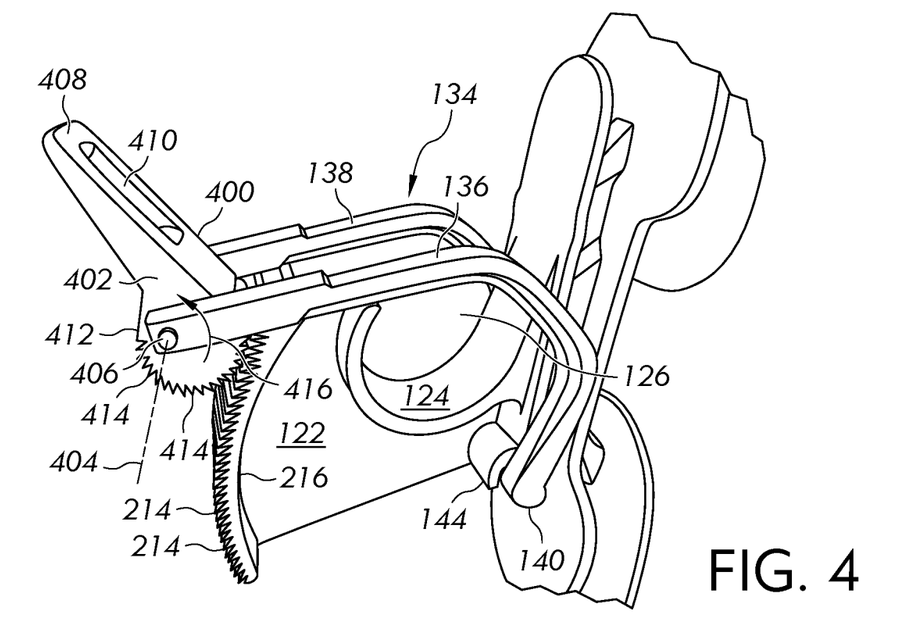
FIG. 4 is a side view of an embodiment of a clamp with a keeper in a first position.
Figure 5:
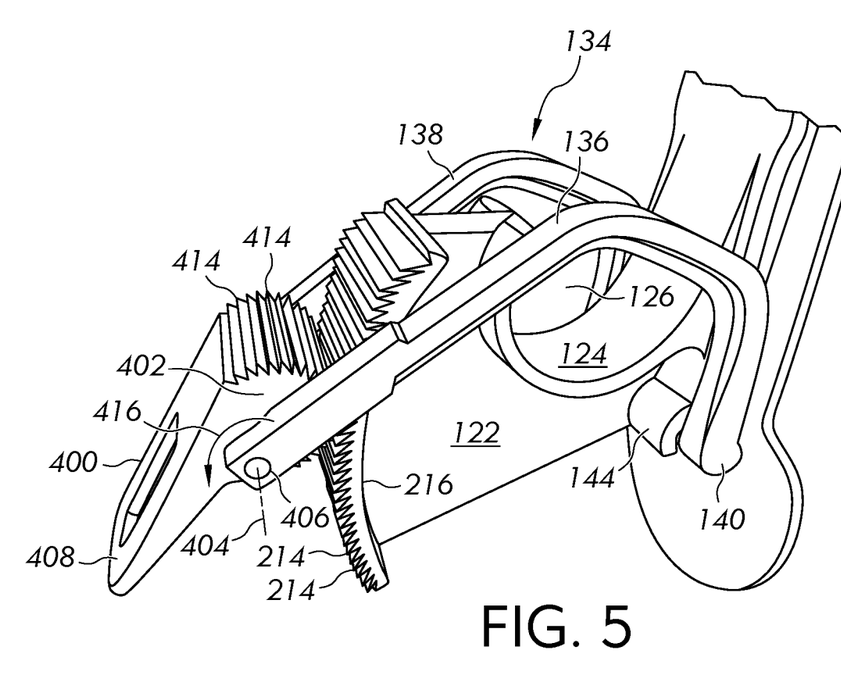
FIG. 5 is a side view of the clamp of FIG. 4, with the keeper adjusted to a second position.

Referring to FIGS. 4 and 5, according to some embodiments, the locking system 146 comprises a ratcheting lever 400 that includes a cam 402 that is pivotal about an axis represented by line 404 defined by a hinge pin 406 to urge portions of the first arm 136 and the second arm 138 of the keeper 134 toward the concave pocket 126 defined by the arcuate surface 124. Such adjustment of the cam 402 adjusts the keeper 134 from the first position to the second position, thereby compressing the cable against the arcuate surface 124 with the concave pocket 126.

Some embodiments of the ratcheting lever 400 comprise a handle 408 that includes an aperture 410 defined by a wall forming a portion of the ratcheting lever 400. Similar to the description above, the illustrated embodiment of the receiver 122 in FIGS. 4 and 5 include at least one, or optionally a plurality of ratchet teeth 214 or other protrusions that extend transversely, in a direction between the first arm 136 and the second arm 138, laterally across the outward facing arcuate surface 216 of the receiver 122. Embodiments of the outward facing arcuate surface 216 have a curvature that extends an angular extent about the hinge pin 140 of the keeper 134 received in the hinge socket 144.

An external, arcuate surface 412 of the cam 402 comprises a plurality of teeth 414 extending transversely between the first arm 136 and the second arm 138. According to some embodiments, the cam 402 is offset relative to the hinge pin 406, to pivot eccentrically about the axis defined by the hinge pin 406. Accordingly, as the keeper 134 is pivoted from the first position (represented in FIG. 4) toward the second position (represented in FIG. 5), and the teeth 414 of the cam 402 tend to move radially away from the ratchet teeth 214, eccentric rotation of the cam 402 maintains engagement of the teeth 414 provided to the cam 402 and the ratchet teeth 214, facilitating a large range of adjustment.

To urge the keeper 134 toward the cable 108, 110, 112 received by the receiver 122, the keeper 134 is manually adjusted about the hinge socket 144 until portions of the first arm 136 and the second arm 138 of the keeper 134 are in close proximity to a region of the cable 108, 110, 112 received in the concave pocket 126 defined, at least in part, by the arcuate surface 124. In this position, the outward facing arcuate surface 216 extends through a space between the first arm 136 and the second arm 138 of the keeper 134. The ratcheting lever 400 is pivotally adjusted about the hinge pin 406 (in the counter-clockwise direction in FIGS. 4 and 5, indicated by arrow 416) through manipulation of the handle 408, causing the teeth 414 of the ratcheting lever 400 to engage at least one of the ratchet teeth 214 provided to the outward facing arcuate surface 216. Such engagement urges portions of the first arm 136 and the second arm 138 toward the cable 108, 110, 112 in the concave pocket 126, thereby establishing a compressive force on the cable 108, 110, 112 strong enough to interfere with relative axial movement of the cable 108, 110, 112 and the receiver 122, and limiting slippage of the cable spacer 100 along the cable 108, 110, 112.

Figure 6:
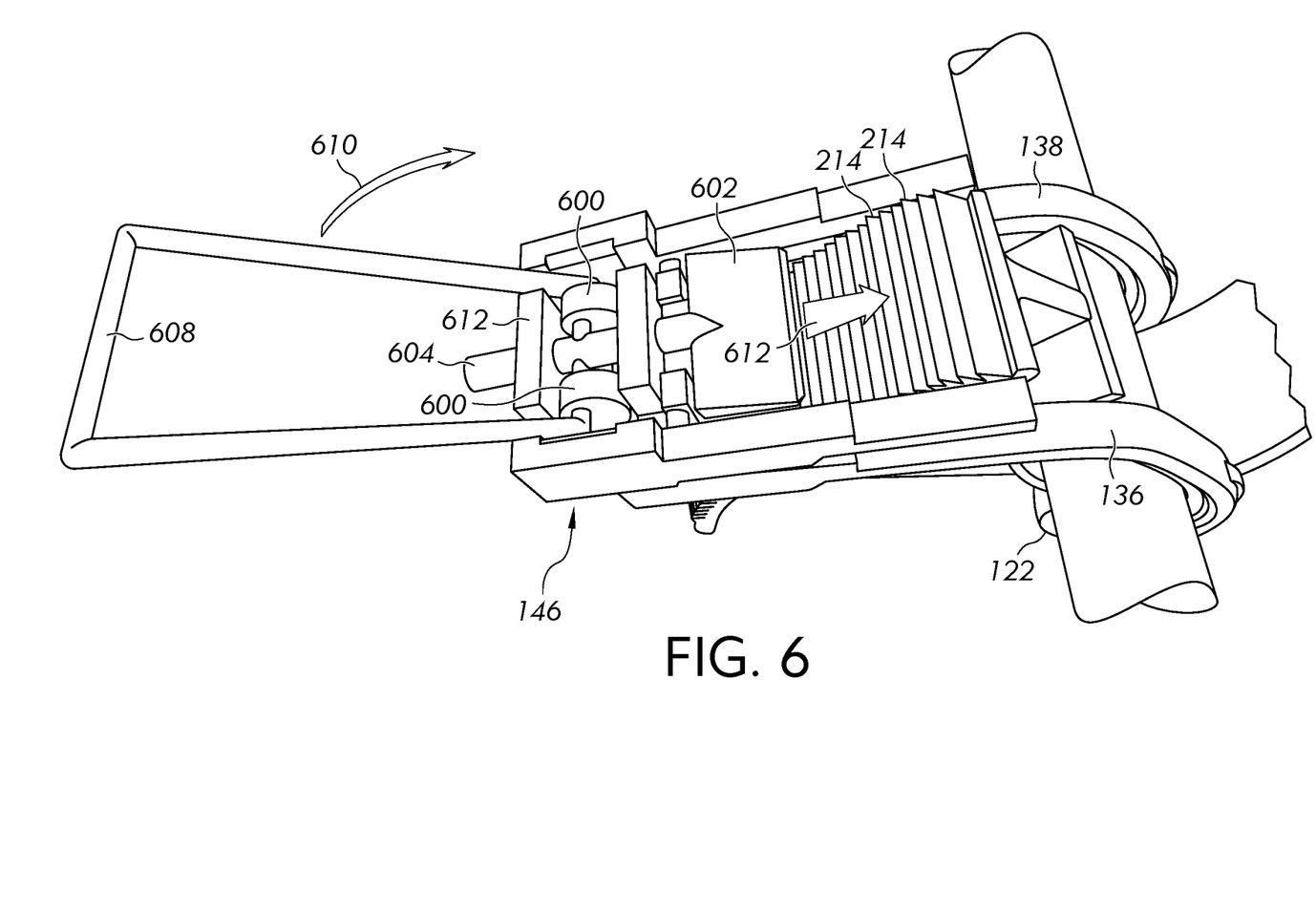
FIG. 6 is a side view of an embodiment of a clamp with a keeper in a first position.
Figure 7:
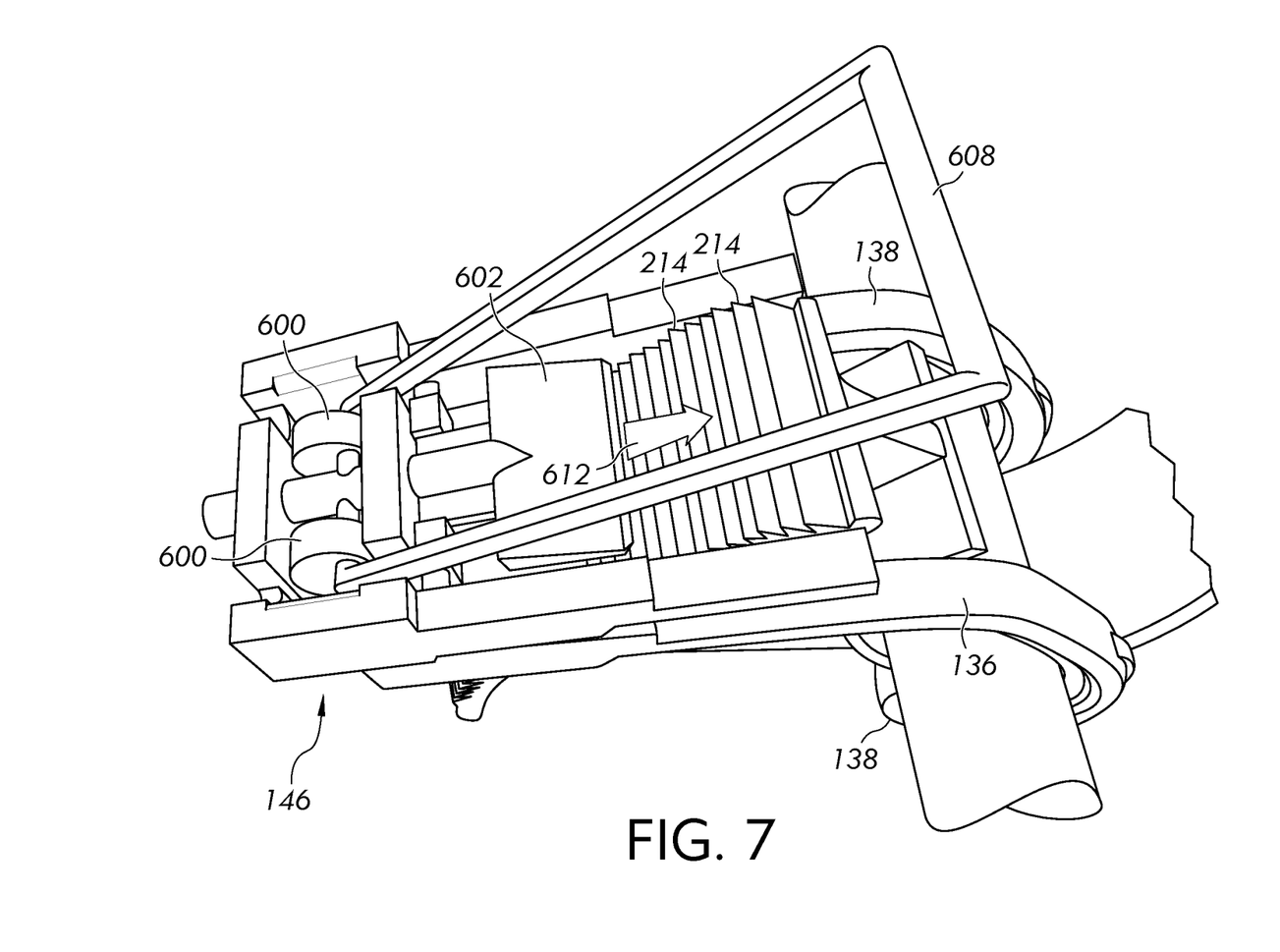
FIG. 7 is a side view of the clamp of FIG. 6, with the keeper adjusted to a second position.

Referring to FIGS. 6 and 7, according to some embodiments, the locking system 146 comprises at least one cam 600, or a plurality of cams 600 that causes adjustment of a tooth 602 to urge portions of the first arm 136 and the second arm 138 toward a cable received within the concave pocket 126 defined by the arcuate surface 124 of the receiver 122. As shown, the cam(s) 600 is/are eccentrically coupled to a member 604, which is coupled to a tooth 602 at a distal end of the linear member 604. Being eccentrically coupled to the member 604, pivotal adjustment of the cam(s) 600 as a result of pivotal adjustment of a handle 608 (in the clockwise direction indicated by arrow 610 in FIG. 6) causes a portion of the cam(s) 600 to make contact with a wall 612. Continued pivotal adjustment of the handle 608 causes the cam(s) 600 to drive the member 604 forward, causing linear translation of the tooth 602 in the direction of arrow 610, toward the receiver 122. This arrangement enables a rotation of the cam 600 to urge the tooth 602 to move back and forth such that as the handle 608 is rotated, the tooth 602 can move relatively quickly during one portion of the handle 608 rotation, and the tooth 602 can move relatively slowly during another portion of the handle 608 rotation due to a profile of the cam 600. Resultant non-linear motion of the tooth 602 enables the described structure to function as a locking mechanism.

Similar to the description above, the illustrated embodiment of the receiver 122 in FIGS. 6 and 7 comprise at least one, or optionally a plurality of ratchet teeth 214 or other protrusions that extend transversely, in a direction between the first arm 136 and the second arm 138, laterally across the outward facing arcuate surface 216 of the receiver 122. As the tooth 602 is driven toward the receiver 122, the tooth engages at least one of the ratchet teeth 214, causing adjustment of the keeper 134 from the first position, shown in FIG. 6, toward the second position shown in FIG. 7. Urging the portions of the first arm 136 and the second arm 138 toward the cable received in the concave pocket 126 defined by the arcuate surface 124, results in a compressive force being exerted on the cable 108, 110, 112 to reduce or eliminate slippage of the cable spacer 100 along the cable 108, 110, 112.

Some embodiments of the keeper 134 lack an adjustable lever or handle that is adjustable relative to the first arm 136 and the second arm 138. However, such embodiments of the keeper 134 have a tendency to flex during application of the forces required to exert the compressive force on the cable 108, 110, 112 received within the concave pocket 126. To limit the extent to which the keeper 134 can flex, the receiver 122 comprises a guide surface that supports the keeper 134 during application of the forces to adjust the keeper 134 from the first position to the second position.

Figure 8:
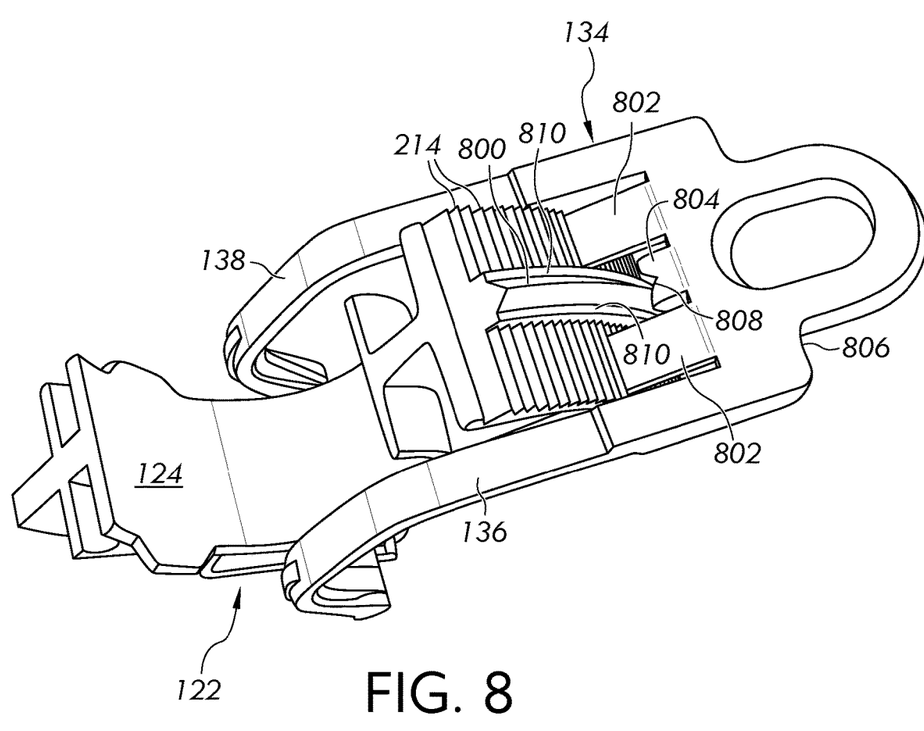
FIG. 8 is a perspective view of an embodiment of a clamp that includes a rib as a guide surface, with a keeper in a first position.
Figure 9:
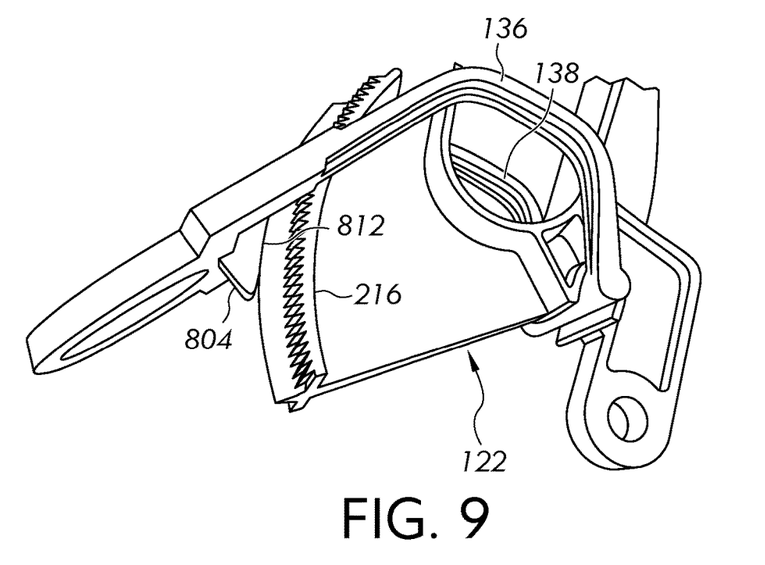
FIG. 9 is a side view of the clamp of FIG. 8, with the keeper adjusted to a second position.

As shown in FIGS. 8 and 9, the guide surface comprises a rib 800 that projects outwardly, away from the outward facing arcuate surface 216 of the receiver 122. The rib 800 extends linearly, along a central region of the ratchet teeth 214, such that a portion of the ratchet teeth 214 extend laterally from both sides of the rib 800. However, alternate embodiments of the guide surface can include a plurality of ribs 800, arranged adjacent to opposite lateral sides of the ratchet teeth 214 or at any other location along the receiver 122.

For embodiments where the rib 800 extends along a central region of the outward facing arcuate surface 216 shown in FIG. 8, the keeper 134 includes one, or a plurality of pawls 802 arranged between the first arm 136 and the second arm 138. The pawls 802 are angled relative to the ratchet teeth 214 of the receiver to slide over the ratchet teeth 214 as the keeper 134 is being adjusted from the first position toward the second position, but to interfere with adjustment of the keeper 134 from the second position back toward the first position. Accordingly, adjustment of the keeper 134 for such embodiments is considered unidirectional.

To support the keeper 134 during adjustment from the first position to the second position, a foot 804 extends generally toward the receiver 122, from a portion of a handle 806 disposed between the first arm 136 and the second arm 138. As shown in FIG. 8, the foot 804 comprises a surface that defines a recess 808 configured to receive a portion of the rib 800. Cooperation between the portion of the rib 800 and the recess 808 maintains alignment of the keeper 134 relative to the receiver 122 as the keeper 134 is adjusted between the first position and the second position.

As shown in FIG. 9, an underside of the foot 804 comprises a surface 812 that is shaped to travel along one or more slide surfaces 810 forming a portion of the rib 800. For example, the surface 812 comprises an arcuate shape in FIG. 9 that is a mirror image of the slide surfaces 810. In other words, the radius of curvature of the surface 812 is approximately the same as the radius of curvature of the slide surfaces 810 extending along the outward facing surface 216 of the receiver 122.

Figure 10:
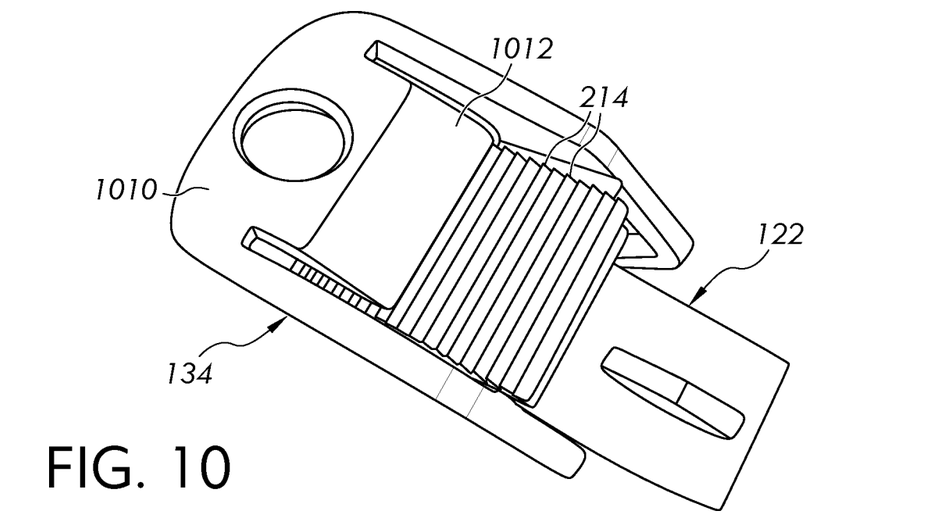
FIG. 10 is a top view of an embodiment of a clamp that includes a plurality of lateral apertures forming guide surfaces.
Figure 11:
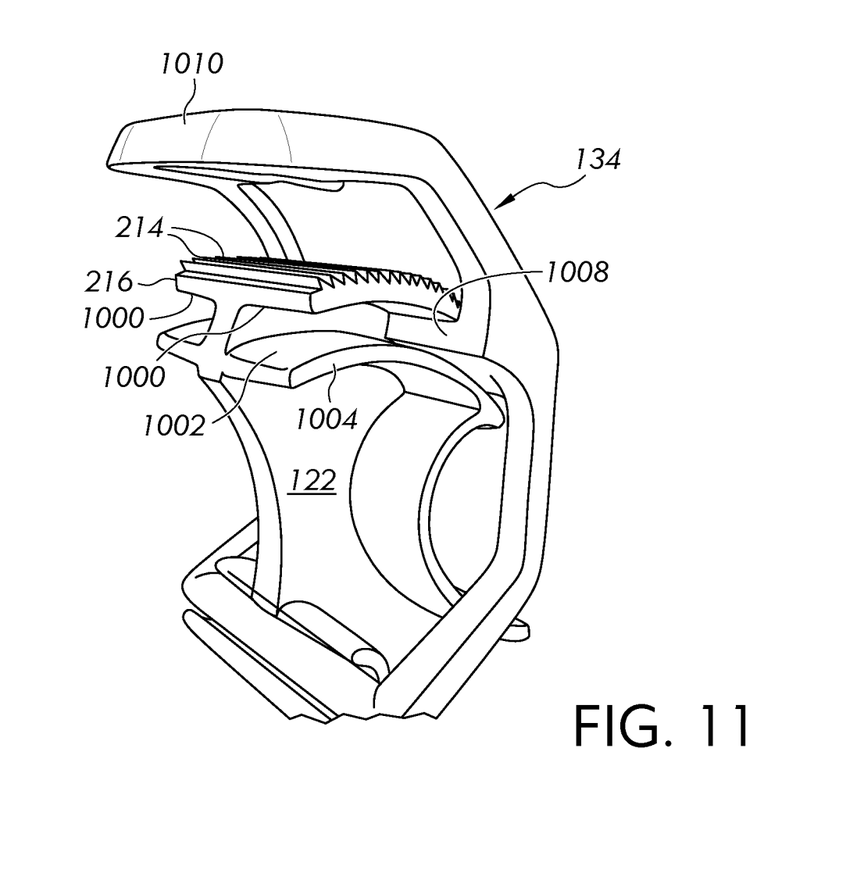
FIG. 11 is a side view of the clamp of FIG. 10.

According to some embodiments, the guide surface provided to the receiver 122 comprises a plurality of surfaces that engage a plurality of feet coupled to the keeper 134. For example, as shown in FIGS. 10 and 11, the guide surface comprises a bottom surface 1000, or underside of the outward facing arcuate surface 216, that is provided with the plurality of ratchet teeth 214. According to some embodiments, the bottom surface 1000 is arcuate in shape and has a radius of curvature that is not equal to a second radius of curvature of the second arcuate surface of the receiver 122 provided with the ratchet teeth 214. The bottom surface 1000, for such embodiments, partially defines an aperture 1002 along with a second arcuate surface 1004 provided to the receiver 122. The aperture 1002 forms a track, defining a permissible direction and range of travel of the keeper 134 relative to the receiver 122.

The keeper comprises feet 1008 that extend laterally inward from the first arm 136 and the second arm 138 of the keeper 134, as shown in FIG. 11. The feet 1008 travel within the aperture 1002 to allow the keeper 134 to be adjusted between the first position and the second position. Since the range of movement of the keeper 134 is limited by the feet 1008 within the apertures 1002, flexing of the keeper 134 as a result of the forces applied on a handle region 1010 is limited. During adjustment of the keeper 134 from the first position toward the second position a pawl 1012 slides over the ratchet teeth 214, but interferes with the keeper traveling in the opposite direction (e.g., toward the first position), thereby securing the keeper 134 in place, where it exerts the compressive force on the cable received within the concave pocket 126.

Figure 12:
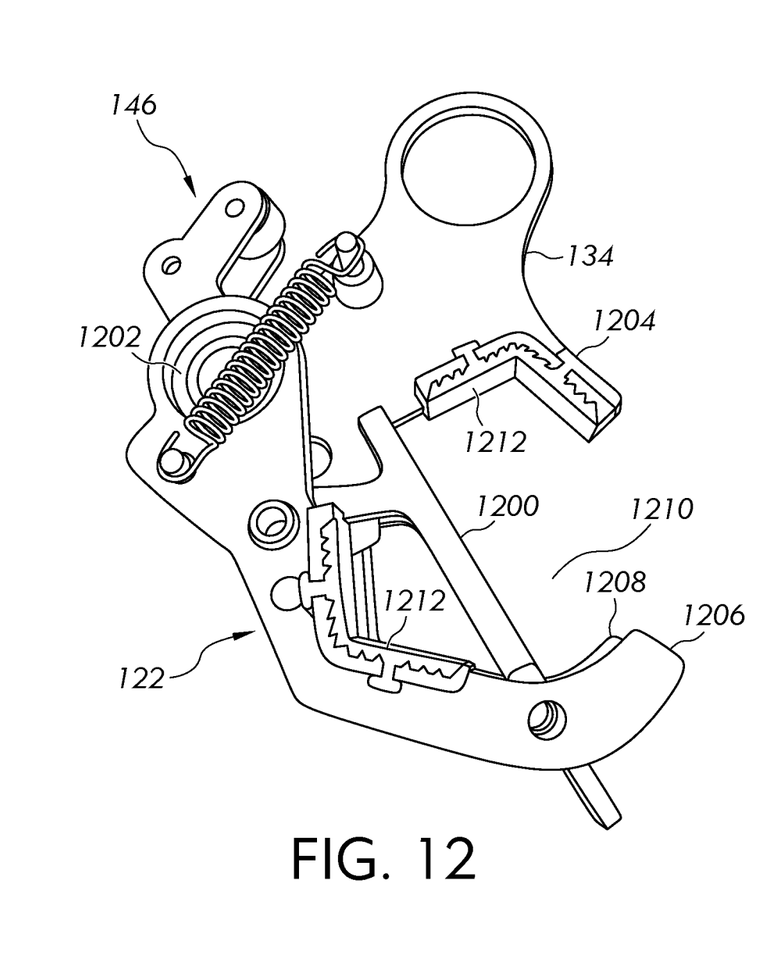
FIG. 12 is a perspective view of an embodiment of a clamp that includes a spring-biased keeper in a first position.
Figure 13:
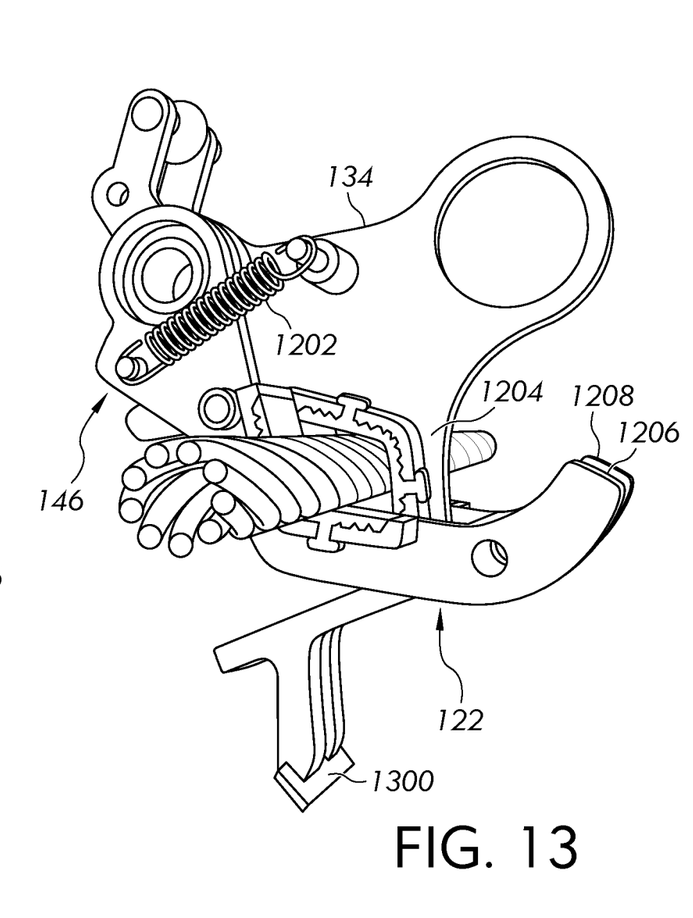
FIG. 13 is a perspective view of the clamp of FIG. 12, with the keeper adjusted to a second position by a spring.

According to some embodiments, the locking system 146 includes a biasing member. For example, the locking system 146 can be spring-biased, to automatically adjust the keeper 134 from the first position to the second position in response to actuation of a trigger 1200. For such embodiments, the keeper 134 is maintained in the first position, shown in FIG. 12, by the trigger 1200. A biasing member such as a spring 1202 or other, similar structure applies a force that urges the keeper 134 toward the second position adjacent to the receiver 122, as shown in FIG. 13. The trigger 1200 overcomes the force exerted by the spring 1202 to maintain the keeper 134 in the first position until the trigger 1200 is actuated by a cable 108 coming into contact with the trigger 1200 while the keeper 134 is in the first position. Contact between the cable 108 and the trigger 1200 releases the keeper 134, allowing the force exerted by the spring 1202 to adjust the keeper 134 from the first position to the second position.

For embodiments comprising a biasing member, such as the spring-biased keeper 134, the keeper 134 comprises a single arm 1204, and the receiver 122 comprises a plurality of arms 1206, 1208 that collectively form the concave pocket 1210. The arm 1204 of the keeper 134 and the arms 1206, 1208 of the receiver 122 include an elastically-compressible liner 1212 that acts as an anti-slip material. Additionally, the force exerted by the spring 1202 that causes compression of the cable between the arm 1204 of the keeper 134 and the arms 1206, 1208 of the receiver 122 can at least partially compress the elastically-compressible liner 1212, limiting relative axial movement of the cable 108, 110, 112 relative to the receiver 122 and interfering with slippage of the cable spacer 100 along the cable 108. Because the spring 1202 maintains the closing force on the keeper 134 while the keeper 134 is in the second position, a separate pawl and ratcheting teeth are unnecessary to maintain the position of the keeper 134 in the second position for such embodiments.

In some examples, the locking system 146 includes a latch 1300 that cooperates with another structure to maintain the keeper 134 in the first position (e.g., the open position), to allow insertion of the region of the first cable 108 into the first concave pocket 1210. Upon contact between the first cable 108 and the trigger 1200, the latch 1300 can be moved away from the cooperating structure to enable the spring 1202 to urge the keeper 134 to the second position (e.g., the closed position).

Figure 14:
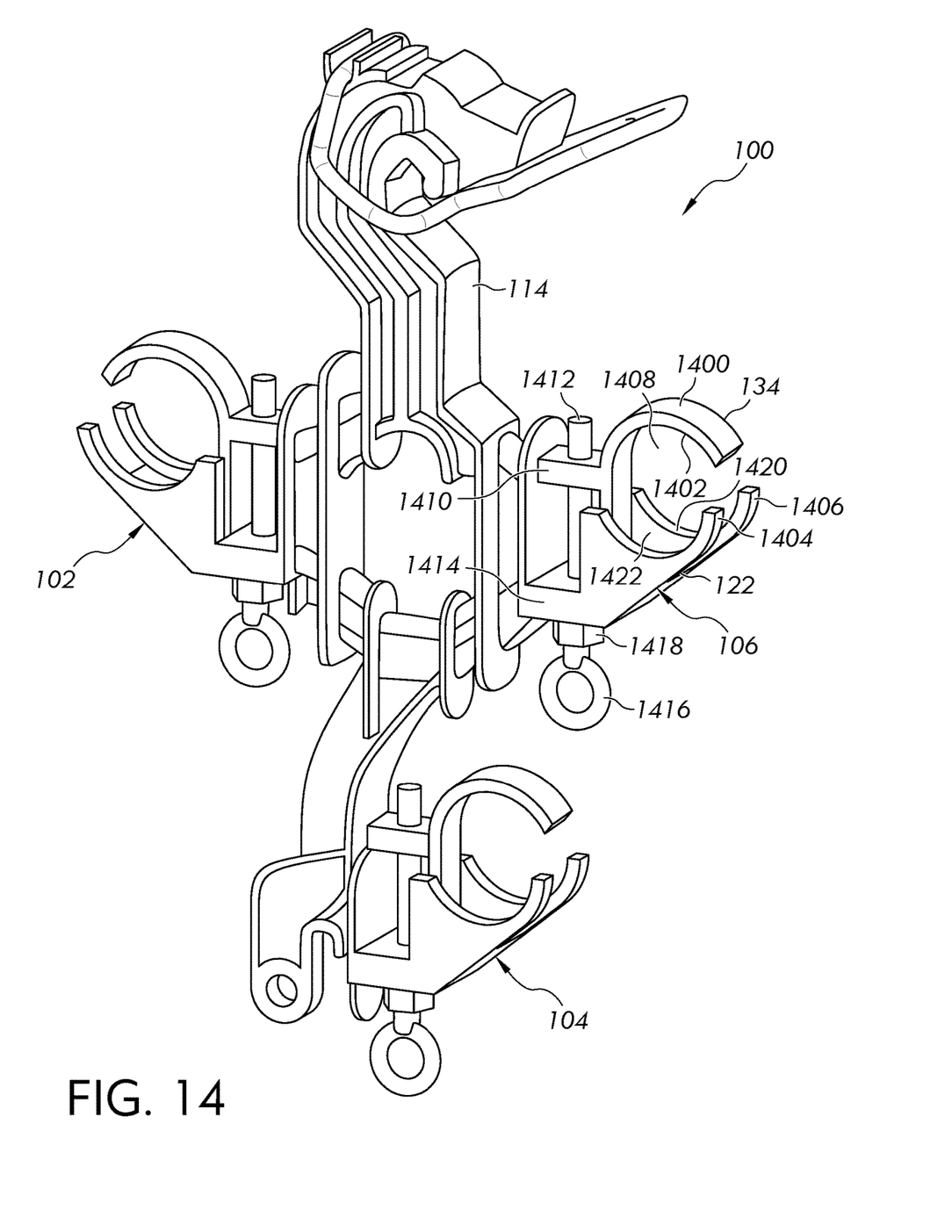
FIG. 14 is a side view of an embodiment of a cable spacer comprising a linearly adjustable keeper.

According to some embodiments, the keeper 134 is linearly adjustable relative to the receiver, as shown in FIG. 14, to impart a clamping force on the cable suitable to interfere with slippage of the cable spacer 100 along the cable. Using the clamp 106 as an example, the keeper 134 comprises an arm 1400 defining an arcuate surface 1402 that is concave down. A female fastener 1410 comprises a side wall provided with internal threading that defines an internal passage for receiving a male threaded fastener 1412.

The receiver comprises a first arm 1404 and a second arm 1406 that collectively form a concave pocket 1408. The first arm 1404 and the second arm 1406 are laterally spaced apart from each other an extent sufficient to allow a portion of the arm 1400 of the keeper 134 to be received between the first arm 1404 and the second arm 1406 when the keeper 134 is adjusted to the second position.

The male threaded fastener 1412, such as a bolt for example, extends through a flange 1414 coupled to the receiver 122. A handle 1416 that, according to some embodiments, is an eye or other structure that can be manipulated by hand or a power tool such as a drill, electric screwdriver, or other apparatus that rotates the male threaded fastener 1412. Linear movement such as translation of the male threaded fastener in the axial direction is constrained by the flange 1414, or the flange 1414 in combination with a secondary fastener such as a threaded nut 1418. Thus, angular adjustment of the male threaded fastener 1412 causes internal threading provided to the female fastener 1410 to engage external threading of the male threaded fastener 1412, resulting in movement of the arm 1400 toward or away from the receiver, depending on the angular direction in which male threaded fastener 1412 is adjusted. With the cable received within the concave pocket 1408, the male threaded fastener 1412 is angularly adjusted by hand or power tool to adjust the arm 1400 of the keeper 134 toward the receiver, exerting a compressive force on the cable 108, 110, 112 between the arm 1400 and the first and second arms 1404, 1406 of the receiver 122.

In some examples, at least one of the first arm 1404 or the second arm 1406 of the receiver 122 define an arcuate surface 1420 that can be referred to as a first arcuate surface. The arcuate surface 1420 defines a first concave pocket 1422. The arcuate surface 1402 defined by the arm 1400 can be referred to as a second arcuate surface that defines the concave pocket 1408. The concave pocket 1408 can be referred to as the second concave pocket. The second concave pocket 1408 opens toward the first concave pocket 1422 defined by the first arcuate surface 1420 of the receiver 122. A pivotal adjustment of the male threaded fastener 1412 positions the keeper (e.g., arm 1400) relative to the receiver 122 to form a circular perimeter that extends about or around an external surface of the region of the first cable 108.

Some embodiments of the cable spacer 100 can include a plurality of the different configurations of the clamps 102, 104, 106 described herein, as shown in FIG. 1, and some embodiments of the cable spacer 100 can include clamps 102, 104, 106 that have a common physical configuration.

Thus, improved cable spacers 100 and clamps 102, 104, 106 are provided according to any aspect or combination of aspects. It will be appreciated that application of the clamps having one or more of the keeper and receiver configurations provided herein may be used in other cable spacers.

Although the subject matter has been described in language specific to structural features or methodological acts, it is to be understood that the subject matter of the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering is contemplated. Further, it will be understood that not all operations are necessarily present in each embodiment provided herein. Also, it will be understood that not all operations are necessary in some embodiments.

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first location and a second location correspond to location A and location B or two different or two identical locations or the same location.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application and the appended claims are generally be construed to mean "one or more" unless specified otherwise or clear from context to be directed to a singular form. Also, at least one of A and B and/or the like generally means A or B or both A and B. Furthermore, to the extent that "includes", "having", "has", "with", or variants thereof are used, such terms are intended to be inclusive in a manner similar to the term "comprising."

Also, although the disclosure has been shown and described with respect to one or more implementations, equivalent alterations and modifications will occur to others of ordinary skill in the art based upon a reading and understanding of this specification and the annexed drawings. The disclosure comprises all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A clamp for maintaining a position of a cable, the clamp comprising:
   a receiver comprising an arcuate surface defining a concave pocket that receives a region of the cable;
   a keeper that is adjustably coupled to the receiver to be adjusted to a first position relative to the receiver, where a first portion of the keeper is separated from the arcuate surface by the region of the cable received within the concave pocket, and interferes with removal of the region of the cable from the concave pocket; and
   a locking system adjustably coupled to the keeper to adjust the keeper from the first position to a second position relative to the receiver, and maintain the keeper in the second position, where the first portion of the keeper, in the second position, exerts a compressive force on the region of the cable, wherein the locking system comprises:
      a rib that projects radially outwardly from an arcuate surface of the receiver; and that adjustably couples the keeper to the receiver, wherein the rib extends in a circumferential direction of the arcuate surface of the receiver.

2. The clamp of claim 1, wherein the keeper comprises:
   a foot that extends away from a second portion of the keeper toward the receiver, wherein the foot is configured to receive a portion of the rib.

3. The clamp of claim 2, wherein the foot comprises:
   a surface that defines a recess configured to receive the portion of the rib to maintain alignment of the keeper relative to the receiver as the keeper is adjusted from the first position to the second position.

4. The clamp of claim 3, wherein the portion of the rib comprises:
   a slide surface along which the surface of the foot travels.

5. The clamp of claim 4, wherein the surface of the foot defines an arcuate shape and the slide surface of the portion of the rib defines an arcuate shape that is a mirror image of the surface of the foot.

6. The clamp of claim 4, wherein a radius of curvature of the surface of the foot is about equal to a radius of curvature of the slide surface of the portion of the rib.

7. A clamp for maintaining a position of a cable, the clamp comprising:
a receiver comprising:
a first arcuate surface defining a concave pocket that receives a region of the cable;
a second arcuate surface having a radius;
a rib that projects radially outwardly from the second arcuate surface of the receiver; and
a projection facing outwardly from the second arcuate surface of the receiver; and
a keeper that is adjustably coupled to the receiver to be adjusted between a first position and a second position relative to the receiver, where a first portion of the keeper is separated from the first arcuate surface by the region of the cable received within the concave pocket, and interferes with removal of the region of the cable from the concave pocket, the keeper comprising:
a foot that extends away from a second portion of the keeper toward the receiver, wherein the foot is configured to receive a portion of the rib; and
a pawl angled relative to the projection of the receiver such that:
the pawl is configured to slide over the projection as the keeper is adjusted from the first position to the second position; and
the pawl is configured to interfere with adjustment of the keeper from the second position to the first position.

8. The clamp of claim 7, wherein the second arcuate surface is convex relative to an axis of rotation about which the keeper rotates relative to the receiver.

9. The clamp of claim 7, wherein the projection facing outwardly from the second arcuate surface is a ratchet tooth.

10. The clamp of claim 7, wherein the rib extends linearly along a central region of the second arcuate surface and the projection facing outwardly from the second arcuate surface extends laterally from a first side and a second side of the rib.

11. The clamp of claim 7, wherein the rib extends linearly along a first side region of the second arcuate surface and a second rib extends linearly along a second side region opposite the first side region of the second arcuate surface and the projection extends between the rib and the second rib.

12. The clamp of claim 7, wherein the keeper comprises:
a handle;
a first arm attached to the handle; and
a second arm attached to the handle, wherein the pawl is arranged between the first arm and the second arm.

13. A cable spacer for maintaining positions of a plurality of cables relative to each other, the cable spacer comprising:
a frame;
a hanger that suspends the frame from a support member; and
a plurality of clamps that couple the plurality of cables to the frame to maintain the positions of the plurality of cables, wherein a first clamp of the plurality of clamps cooperates with a region of a first cable of the plurality of cables, the first clamp comprising:
a receiver comprising:
a first arcuate surface defining a concave pocket that receives the region of the first cable;
a second arcuate surface having a radius; and
a rib that projects radially outwardly from the second arcuate surface of the receiver; and
a keeper that is adjustably coupled to the receiver to be adjusted between a first position and a second position relative to the receiver, where a first portion of the keeper is separated from the first arcuate surface by the region of the cable received within the concave pocket, and interferes with removal of the region of the cable from the concave pocket, the keeper comprising:
a foot that extends away from a second portion of the keeper toward the receiver, wherein the foot is configured to receive a portion of the rib.

14. The cable spacer of claim 13, comprising an anti-slip material on the first arcuate surface to interfere with axial movement of the region of the first cable within the concave pocket.

15. The cable spacer of claim 13, wherein:
the receiver comprises a first projection that projects from a surface of the receiver, and
the keeper comprises a locking member that cooperates with the first projection to maintain the keeper in the second position.

16. The cable spacer of claim 13, comprising:
a ratchet assembly comprising:
a plurality of projections that define a range of different adjustment options for maintaining the keeper in the second position; and
a pawl that engages at least one of the plurality of projections to interfere with adjustment of the keeper from the second position.

17. The cable spacer of claim 16, wherein the plurality of projections are linearly arranged along the second arcuate surface of the receiver, and the pawl is formed as a portion of the keeper.

18. The cable spacer of claim 13, wherein the rib extends linearly along a central region of the second arcuate surface and a projection facing outwardly from the second arcuate surface extends laterally from a first side and a second side of the rib.

19. The cable spacer of claim 13, wherein the rib extends linearly along a first side region of the second arcuate surface and a second rib extends linearly along a second side region opposite the first side region of the second arcuate surface and a projection extends between the rib and the second rib.

20. The cable spacer of claim 13, wherein the second arcuate surface is convex relative to an axis of rotation about which the keeper rotates relative to the receiver.

* * * * *